2,975,171

2-ACYL- AND 2-ALKYL-2 ACYL-4-PREGNENE 17α-OL-3,20-DIONES

George I. Poos, North Plainfield, N.J., assignor to Merck & Co., Inc., Rahway, N.J., a corporation of New Jersey No Drawing. Filed Dec. 16, 1955, Ser. No. 553,432

19 Claims. (Cl. 260—239.55)

This invention is concerned generally with novel steroid compounds and with processes of preparing the same. More particularly, it relates to novel 2-alkyl-4-pregnene-17α-ol-3,20-dione compounds, and to the process of preparing these compounds by reacting a 4-pregnene-17α-ol-3-one having an oxygen atom connected by a single bond to the C-20 carbon, and which may have an acyl radical attached to the C-2 carbon atom, with an alkylating agent. The 2-alkyl-4-pregnene-17α-ol-3,20-dione compounds possess extremely high anti-inflammatory activity, and are especially effective in the treatment of arthritis and related diseases since they can be administered for their cortisone-like action in extremely low dosage thereby minimizing undesired side effects.

These novel 2-alkyl-4-pregnene-17α-ol-3,20-dione compounds, subject of the present invention, may be chemically represented as follows:

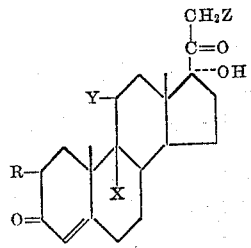

wherein R is alkyl; X is hydrogen or fluoro; Y is hydrogen, keto or hydroxy; and Z is hydrogen, hydroxy or acyloxy.

In accordance with a preferred embodiment of the present invention these novel 2-alkyl-4-pregnene-17α-ol-3,20-dione compounds are prepared by reacting a corresponding 2-acyl-4-pregnene-17α-ol-3,20-dione 20 ketal with an alkylating agent such as an alkyl iodide to produce the corresponding 2-alkyl-2-acyl-4-pregnene-17α-ol-3,20-dione 20-ketal which is then reacted with an alkaline hydrolyzing agent thereby effecting hydrolyses of the 2-acyl substituent followed by an acidic hydrolyzing agent thereby hydrolyzing the 20-ketal to produce the corresponding 2-alkyl-4-pregnene-17α-ol-3,20-dione.

Alternatively, the C-20 ketone may be protected by conversion to a thioketal grouping or by reduction to a hydroxy grouping.

When the C-20 ketone is converted to a ketal, it is ordinarily preferred to use a cyclic alkylene ketal e.g. ethylene ketal, propylene ketal, and the like. The 20-monoketal of the 4-pregnene-17α-ol-3,20-dione compound is conveniently prepared by reacting 4-pregnene-17α-ol-3,20-dione with an excess of ethylene glycol under anhydrous conditions in the presence of an acidic catalyst to produce the 3,20-bis (ethylenedioxy) 4-pregnene-17α-ol compound which is then selectively hydrolyzed with 90% aqueous acetic acid to form the corresponding 20-ethylenedioxy-4-pregnene-17α-ol-3-one; other 20-alkylenedioxy-4-pregnene-17α-ol-3-one compounds are similarly prepared.

The condensation reaction between the 20-alkylenedioxy-4-pregnene-17α-ol-3-one and the alkyl ester is conveniently conducted by bringing reactants together under anhydrous conditions in the presence of a strong base such as sodium methoxide and preferably in the presence of an inert solvent such as benzene thereby forming a corresponding 2-acyl-20-alkylenedioxy-17α-ol-3-one.

The alkyl esters which are conveniently employed in this reaction include methyl formate, methyl acetate, dimethyl oxalate etc.; I prefer to utilize methyl oxalate. Thus, when a 20-ethylenedioxy-4-pregnene-17α-ol-3-one compound such as 20-ethylenedioxy-4-pregnene-17α,21-diol-3,11-dione is reacted with dimethyl oxalate the desired 2 - methyloxalyl-20-ethylenedioxy-4-pregnene-17α,21-diol-3,11-dione is obtained in good yield; moreover, the 2-methyloxalyl substituent exists largely in the keto form in contrast with a 2-formyl group which exists largely in an enol (2-hydroxymethylene) form. Accordingly, the 2-methyloxalyl-20-ethylenedioxy-4-pregnene-17α,21-diol-3,11-dione is particularly suited to the reaction with the alkylating agent since it does not readily undergo an O-methylation as in the case of the corresponding 2-formyl derivative.

The reaction between the alkylating agent such as methyl iodide and the 2-acyl - 20 - alkylenedioxy-4-pregnene-17α-ol-3-one compound such as 2-methyloxalyl-20-ethylenedioxy - 4 - pregnene-11β,17α,21-triol-3-one is conveniently conducted by bringing the reactants together with an organic solvent such as methanol or acetone in the presence of a base such as a carbonate thereby forming the corresponding 2-alkyl-2-acyl-20-alkylenedioxy-4-pregnene-17α-ol-3-one such as 2-methyl-2-methyloxalyl-20-ethylenedioxy-4-pregnene-11β,17α,21-triol-3-one.

The alkaline hydrolysis of this 2-acyl intermediate is conveniently conducted under mildly basic conditions, as for example with aqueous alcoholic bicarbonate solution, thereby forming the 2-alkyl-20-alkylenedioxy-4-pregnene-17α-ol-3-one such as 2-methyl-20-ethylenedioxy-4-pregnene-11β,17α,21-triol-3-one.

The acid hydrolysis of the 20-monoketal is conveniently effected under mild acidic hydrolysis conditions or by ketal interchange as for example by reacting with acetone in the presence of an acidic catalyst such as p-toluenesulfonic acid whereby the 20-keto substituent is regenerated to form a 2-alkyl-4-pregnene-17α-ol-3,20-dione such as 2-methyl-4-pregnene-11β,17α,21-triol-3,20-dione.

The latter compound is reacted with an acylating agent such as acetic anhydride, propionic anhydride, caproic anhydride, tertiarybutyl-acetyl chloride, and the like, to form the corresponding 2-alkyl-21-acyloxy-4-pregnene-17α-ol-3-one compound such as 2-methyl-4-pregnene-11β,17α,21-triol-3,20-dione 21-acetate, 21-propionate, 21-(tertiarybutylacetate), and the like.

The following examples illustrate methods of carrying out the present invention but it is to be understood that these examples are given for purposes of illustration and not of limitation.

Example 1

To a solution of 950 mg. of 2-formyl-20-ethylenedioxy-4-pregnene-17α,21-diol-3,11-dione in 10 ml. of acetone is added 1.8 g. of anhydrous potassium carbonate and 2 ml. of methyl iodide, and the mixture is stirred at room temperature for a period of three hours. An additional 1 ml. of methyl iodide is added and the resulting mixture is stirred overnight. The reaction mixture is evaporated to dryness under vacuum, and the residual material is distributed between water and chloroform. The chloroform phase is separated, dried, and evaporated to dryness. The residual material is crystallized from methanol to give 2-methoxymethylene-20-ethylenedioxy-4-pregnene-17α,21-diol-3,11-dione as a crystalline product.

To the methanolic mother liquors are added 5 ml. of aqueous sodium bicarbonate solution, and the resulting mixture is allowed to stand at room temperature overnight. Water is added, the methanol is evaporated under vacuum, and the aqueous mixture is extracted with chloroform. The chloroform extract is dried, evaporated to a small volume and diluted with three volumes of ether. The resulting ether-chloroform solution is adsorbed onto 28 g. of acid-washed alumina. The adsorbate is then eluted with (1) mixtures of ether and chloroform; (2) chloroform and (3) mixtures of chloroform and acetone. The chloroform and chloroform-acetone eluates are combined, evaporated to dryness, and the residual material is recrystallized, first from methanol, and then from ethyl acetate to give substantially pure 2-methyl-20-ethylenedioxy-4-pregnene-17α,21-diol - 3,11 - dione; M.P. 225–228° C.

To a solution of 60 mg. of 2-methyl-20-ethylenedioxy-4-pregnene-17α,21-diol-3,11-dione in 20 ml. of acetone is added 10 mg. of p-toluene sulfonic acid, and the resulting solution is heated under reflux for a period of 16 hours. An additional 10 mg. of p-toluene sulfonic acid is added, and the solution is heated for an additional 5 hours. The reaction mixture is diluted with water, and the acetone is distilled from the aqueous mixture under vacuum. The resulting aqueous suspension is extracted with several portions of chloroform, and the chloroform extracts are combined and washed with dilute aqueous sodium bicarbonate solution. The chloroform layer is then dried and evaporated to dryness. The residual material is crystallized from ethyl acetate whereupon some unchanged starting material separates as a crystalline product. The ethyl acetate mother liquors are evaporated to dryness, and the residual material is dissolved in ½ ml. of pyridine. To the pyridine solution is added 0.25 ml. of acetic anhydride, and the resulting solution is heated at 100° C. for a period of 15 minutes. A mixture of ice and water is added to the reaction solution, whereupon a crystalline material separates which is recovered by filtration, washed with water and dried. This material is dissolved in 8.2 ether-chloroform, and the resulting solution is adsorbed on to acid-washed alumina. The adsorbate is eluted with mixtures of ether and chloroform, the 3:7 ether-chloroform eluant is evaporated to dryness, and the residual material is recrystallized from ether to give substantially pure 2-methyl-4-pregnene-17α,21-diol-3,11,20-trione 21-acetate; M.P. 158–161° C.

To a solution of 0.41 gram of 2-methyl-4-pregnene-17α,21-diol-3,11,20-trione 21-acetate in 20 ml. of absolute methanol, maintained under a nitrogen atmosphere, is added 0.5 ml. of a 2.0 N anhydrous methanolic solution of sodium methoxide. The resulting solution is allowed to stand at room temperature under the nitrogen atmosphere for a period of ten minutes, 0.07 ml. of acetic acid is added to the reaction mixture, and to the resulting mixture is added 20 ml. of ice water. The methanol is evaporated from the aqueous mixture under vacuum, and the crystalline material which precipitates is recovered by filtration, washed with water and dried to give substantially pure 2-methyl-4-pregnene-17α,21-diol-3,11,20-trione.

The 2-formyl-20-ethylenedioxy-4-pregnene-17α,21-diol-3,11-dione used as starting material in this example may be prepared as follows: 6 ml. of a 2 N methanolic solution of sodium methoxide is evaporated to dryness under vacuum, and the residual material is dried under vacuum at 100° C. To the dry sodium methoxide is added 25 ml. of dry benzene, 1.20 g. of 20-ethylenedioxy-4-pregnene-17α,21-diol-3,11-dione and 18 ml. of methyl formate. The resulting mixture is stirred overnight at room temperature, and to the reaction solution is added a mixture of chloroform and an aqueous solution of sodium dihydrogen phosphate. The organic layer is separated, and the aqueous phase is extracted three times with chloroform. The combined chloroform solution is dried over anhydrous magnesium sulfate, evaporated to dryness, and the residual crystalline material is dissolved in methylene chloride. The methylene chloride solution is cooled to 0° C. and shaken with 25 ml. of 1% aqueous potassium hydroxide solution. The cold aqueous alkaline solution is rapidly withdrawn and acidified with cold 0.1 N-aqueous sulfuric acid. The resulting acidic aqueous suspension is extracted with several portions of methylene chloride, the methylene chloride extracts are combined, dried and evaporated to dryness. The residual material is recrystallized from ethyl acetate to give 2-formyl-20-ethylenedioxy-4-pregnene-17α,21-diol-3,11-dione.

*Example 2*

To a solution of 615 mg. of 2-methyloxalyl-20-ethylenedioxy-4-pregnene-17α,21-diol-3,11-dione in 15 ml. of acetone is added 1.24 g. of anhydrous potassium carbonate and 1.5 ml. of propyl iodide, and the mixture is stirred overnight. The reaction mixture is evaporated to dryness under vacuum, and the residual material is distributed between water and chloroform. The chloroform phase is separated, and the aqueous phase is washed with several portions of chloroform. The combined chloroform extracts are dried and evaporated to dryness to give 2 - propyl - 2 - methyl-oxalyl-20-ethylenedioxy-4-pregnene-17α,21-diol-3,11-dione.

This 2-propyl-2-methyloxalyl-20-ethylenedioxy-4-pregnene-17α,21-diol-3,11-dione is dissolved in 10 ml. of methanol, and to the solution is added 5 ml. of a 10% aqueous solution of sodium carbonate. The resulting solution is heated under reflux for one hour, the reaction solution is diluted with water, and the methanol is evaporated therefrom under vacuum. The residual aqueous mixture is extracted with chloroform, and the combined chloroform extracts are washed with water, dried, and evaporated to a small volume. This solution is intimately contacted with acid-washed alumina and the resulting adsorbate is eluted with chloroform and a mixture of chloroform and acetone to give 2-propyl-20-ethylenedioxy-4-pregnene-17α,21-diol-3,11-dione.

To a solution of 300 mg. of 2-propyl-20-ethylenedioxy-4-pregnene-17α,21-diol-3,11-dione in 100 ml. of acetone is added 50 mg. of p-toluene sulfonic acid, and the resulting solution is heated under reflux for a period of 16 hours. An additional 50 mg. of p-toluene sulfonic acid is added, and the solution is heated for an additional 5 hours. The reaction mixture is diluted with water, and the acetone is distilled from the aqueous mixture under vacuum. The resulting aqueous suspension is extracted with several portions of chloroform, and the chloroform extracts are combined and washed with dilute aqueous sodium bicarbonate solution. The chloroform layer is then dried and evaporated to dryness. The residual material is crystallized from ethyl acetate whereupon some unchanged starting material separates as a crystalline product. The ethyl acetate mother liquors are evaporated to dryness, and the residual material is dissolved in 3 ml. of pyridine. To the pyridine solution is added 1.5 ml. of acetic anhydride, and the resulting solution is heated at 100° C. for a period of 15 minutes. A mixture of ice and water is added to the reaction solution, whereupon a crystalline material separates which is recovered by filtration, washed with water and dried. This material is dissolved in 8:2 ether-chloroform, and the resulting solution is adsorbed on to acid-washed alumina. The adsorbate is eluted with mixtures of ether and chloroform, the 3:7 ether-chloroform eluant is evaporated to dryness, and the residual material is recrystallized from ether to give substantially pure 2-propyl-4-pregnene-17α,21-diol-3,11,20-trione 21-acetate.

The 2-methyloxalyl - 20 - ethylenedioxy - 4 - pregnene-17α,21-diol-3,11-dione used as starting material in this example may be prepared as follows: 5 ml. of 2 N sodium methoxide is evaporated to dryness in vacuo at 100° C. and 25 ml. of dry benzene is added thereto. To the mixture is added one gram of 20-ethylenedioxy-4-pregnene-17α,21-diol-3,11-dione and two grams of dimethyl oxalate, and the resulting mixture is stirred at room temperature for 16 hours. Chloroform, and an excess of an aqueous solution of sodium dihydrogen phosphate, are added to the reaction mixture, the chloroform layer is separated, and the aqueous layer is extracted with additional chloroform. The combined chloroform extracts are washed with water, dried, and evaporated to dryness under high vacuum thereby removing excess dimethyl oxalate. The residual material is dissolved in methylene chloride, and the methylene chloride solution is shaken with 20 ml. of cold 1% aqueous potassium hydroxide solution; the aqueous alkaline layer is rapidly withdrawn and acidified with 20 ml. of cold 0.1 N aqueous sulfuric acid solution and excess sodium dihydrogen phosphate. The resulting slurry is extracted with chloroform, and the chloroform extract is dried and evaporated to dryness. The residual material is recrystallized from ethyl acetate to give substantially pure 2-methyloxalyl - 20 - ethylenedioxy - 4 - pregnene-17α,21-diol-3,11-dione.

*Example 3*

To a solution of 615 mg. of 2-methyloxalyl-20-ethylenedioxy-4-pregnene-11β,17α,21-triol-3-one in 15 ml. of acetone is added 1.24 g. of anhydrous potassium carbonate and 1.5 ml. of methyl iodide, and the mixture is stirred overnight. The reaction mixture is evaporated to dryness under vacuum, and the residual material is distributed between water and chloroform. The chloroform phase is separated, and the aqueous phase is washed with several portions of chloroform. The combined chloroform extracts are dried and evaporated to dryness to give 2-methyl-2-methyloxalyl-20-ethylenedioxy-4-pregnene-11β,17α,21-triol-3-one.

This 2-methyl-2-methyloxalyl-20-ethylenedioxy-4-pregnene-11β,17α,21-triol-3-one is dissolved in 10 ml. of methanol, and to the solution is added 5 ml. of a 10% aqueous solution of sodium carbonate. The resulting solution is heated under reflux for one hour, the reaction solution is diluted with water, and the methanol is evaporated therefrom under vacuum. The residual aqueous mixture is extracted with chloroform, and the combined chloroform extracts are washed with water, dried, and evaporated to a small volume. This solution is intimately contacted with acid-washed alumina, and the resulting adsorbate is eluted with chloroform and a mixture of chloroform and acetone to give 2-methyl-20-ethylenedioxy-4-pregnene-11β,17α,21-triol-3-one.

To a solution of 300 mg. of 2-methyl-20-ethylenedioxy-4-pregnene-11β,17α,21-triol-3-one in 100 ml. of acetone is added 50 mg. of p-toluene sulfonic acid, and the resulting solution is heated under reflux for a period of 16 hours. An additional 50 mg. of p-toluene sulfonic acid is added, and the solution is heated for an additional 5 hours. The reaction mixture is diluted with water, and the acetone is distilled from the aqueous mixture under vacuum. The resulting aqueous suspension is extracted with several portions of chloroform, and the chloroform extracts are combined and washed with dilute aqueous sodium bicarbonate solution. The chloroform layer is then dried and evaporated to dryness. The residual material is crystallized from ethyl acetate whereupon some unchanged starting material separates as a crystalline product. The ethyl acetate mother liquors are evaporated to dryness, and the residual material is dissolved in 3 ml. of pyridine. To the pyridine solution is added 1.5 ml. of acetic anhydride, and the resulting solution is heated at 100° C. for a period of 15 minutes. A mixture of ice and water is added to the reaction solution, whereupon a crystalline material separates which is recovered by filtration, washed with water and dried. This material is dissolved in 8:2 ether-chloroform, and the resulting solution is adsorbed on to acid-washed alumina. The adsorbate is eluted with mixtures of ether and chloroform, the 3:7 ether-chloroform eluant is evaporated to dryness, and the residual material is recrystallized from ether to give substantially pure 2-methyl-4-pregnene-11β,17α,21-triol-3,20-dione 21-acetate.

To a solution of 200 mg. of 2-methyl-4-pregnene-11β,17α,21-triol-3,20-dione 21-acetate in 20 ml. of absolute methanol, maintained under a nitrogen atmosphere, is added 0.25 ml. of a 2.0 N anhydrous methanolic solution of sodium methoxide. The resulting solution is allowed to stand at room temperature under the nitrogen atmosphere for a period of ten minutes, 0.03 ml. of acetic acid is added to the reaction mixture, and to the resulting mixture is added 20 ml. of ice water. The methanol is evaporated from the aqueous mixture under vacuum, and the crystalline material which precipitates is recovered by filtration, washed with water and dried to give substantially pure 2-methyl-4-pregnene-11β,17α,21-triol-3,20-dione.

The 2-methyloxalyl-20-ethylenedioxy-4-pregnene-11β,17α,21-triol-3-one used as starting material in this example may be prepared as follows: A solution of 10 grams of 3,20-bis(ethylenedioxy)-5-pregnene-11β,17α,21-triol in 400 ml. of 90% aqueous acetic acid solution is heated on a steam bath for about 20 minutes, and the aqueous reaction mixture is extracted with chloroform. The chloroform extract is washed with water and dried. The chloroform extract is evaporated to dryness in vacuo, and the residual material is crystallized to give substantially pure 20-ethylenedioxy-4-pregnene-11β,17α,21-triol-3-one. 5 ml. of 2 N sodium methoxide is evaporated to dryness in vacuo at 100° C. and 25 ml. of dry benzene is added thereto. To the mixture is added one gram of 20-ethylenedioxy-4-pregnene-11β,17α,21-triol - 3 - one and two grams of dimethyl oxalate, and the resulting mixture is stirred at room temperature for 16 hours. Chloroform, and an excess of an aqueous solution of sodium dihydrogen phosphate, are added to the reaction mixture, the chloroform layer is separated, and the aqueous layer is extracted with additional chloroform. The combined chloroform extracts are washed with water, dried, and evaporated to dryness under high vacuum thereby removing excess dimethyl oxalate. The residual material is dissolved in methylene chloride, and the methylene chloride solution is shaken with 20 ml. of cold 1% aqueous potassium hydroxide solution; the aqueous alkaline layer is rapidly withdrawn and acidified with 20 ml. of cold 0.1 N aqueous sulfuric acid solution and excess sodium dihydrogen phosphate. The resulting slurry is extracted with chloroform, and the chloroform extract is dried and evaporated to dryness. The residual material is recrystallized from ethyl acetate to give substantially pure 2-methyloxalyl - 20 - ethylenedioxy - 4 - pregnene - 11β,17α,21-triol-3-one.

*Example 4*

To a solution of 615 mg. of 2-methyloxalyl-20-ethylenedioxy-4-pregnene-11β,17α,21-triol-3-one in 15 ml. of acetone is added 1.24 g. of anhydrous potassium carbonate and 1.5 ml. of ethyl iodide, and the mixture is stirred overnight. The reaction mixture is evaporated to dryness under vacuum, and the residual material is distributed between water and chloroform. The chloroform phase is separated, and the aqueous phase is washed with several portions of chloroform. The combined chloroform extracts are dried and evaporated to dryness to give 2-ethyl-2 - methyloxalyl - 20 - ethylenedioxy - 4 - pregnene - 11β,17α,21-triol-3-one.

This 2 - ethyl-2-methyloxalyl-20-ethylenedioxy-4-pregnene-11β,17α,21-triol-3-one is dissolved in 10 ml. of methanol, and to the solution is added 5 ml. of a 10% aqueous solution of sodium carbonate. The resulting solution is heated under reflux for one hour, the reaction solution is diluted with water, and the methanol is evaporated therefrom under vacuum. The residual aqueous mixture is extracted with chloroform, and the combined chloroform extracts are washed with water, dried, and evaporated to a small volume. This solution is intimately contacted with acid-washed alumina, and the resulting adsorbate is eluted with chloroform and a mixture of chloroform and acetone to give 2-ethyl-20-ethylenedioxy-4-pregnene-11β,17α,21-triol-3-one.

To a solution of 300 mg. of 2-ethyl-20-ethylenedioxy-4-pregnene-11β,17α,21-triol-3-one in 100 ml. of acetone is added 50 mg. of p-toluene sulfonic acid, and the resulting solution is heated under reflux for a period of 16 hours. An additional 50 mg. of p-toluene sulfonic acid is added, and the solution is heated for an additional 5 hours. The reaction mixture is diluted with water, and the acetone is distilled from the aqueous mixture under vacuum. The resulting aqueous suspension is extracted with several portions of chlorofrom, and the chloroform extracts are combined and washed with dilute aqueous sodium bicarbonate solution. The chloroform layer is then dried and evaporated to dryness. The residual material is crystallized from ethyl acetate whereupon some unchanged starting material separates as a crystalline product. The ethyl acetate mother liquors are evaporated to dryness, and the residual material is dissolved in 3 ml. of pyridine. To the pyridine solution is added 1.5 ml. of acetic anhydride, and the resulting solution is heated at 100° C. for a period of 15 minutes. A mixture of ice and water is added to the reaction solution, whereupon a crystalline material separates which is recovered by filtration, washed with water and dried. This material is dissolved in 8:2 ether-chloroform, and the resulting solution is adsorbed on to acid-washed alumina. The adsorbate is eluted with mixtures of ether and chloroform, the 3:7 ether-chloroform eluant is evaporated to dryness, and the residual material is recrystallized from ether to give substantially pure 2-ethyl-4-pregnene-11β, 17α,21-triol-3,20-dione 21- acetate.

To a solution of 200 mg. of 2-ethyl-4-pregnene-11β, 17α,21-triol-3,20-dione 21-acetate in 20 ml. of absolute methanol, maintained under a nitrogen atmosphere, is added 0.25 ml. of a 2.0 N anhydrous methanolic solution of sodium methoxide. The resulting solution is allowed to stand at room temperature under the nitrogen atmosphere for a period of ten minutes, 0.03 ml. of acetic acid is added to the reaction mixture, and to the resulting mixture is added 20 ml. of ice water. The methanol is evaporated from the aqueous mixture under vacuum, and the crystalline material which precipitatese is recovered by filtration, washed with water and dried to give substantially pure 2-ethyl-4-pregnene-11β,17α,21-triol-3,20-dione.

*Example 5*

To a solution of 615 mg. of 2-methyloxalyl-9α-fluoro-20-ethylenedioxy-4-pregnene-11β,17α,21-triol-3-one in 15 ml. of acetone is added 1.24 g. of anhydrous potassium carbonate and 1.5 ml. of methyl iodide, and the mixture is stirred overnight. The reaction mixture is evaporated to dryness under vacuum, and the residual material is distributed between water and chloroform. The chloroform phase is separated, and the aqueous phase is washed with several portions of chloroform. The combined chloroform extracts are dried and evaporated to dryness to give 2-methyl-2-methyloxalyl-9α-fluoro-20-ethylenedioxy-4-pregnene-11β,17α,21-triol-3-one.

This 2-methyl-2-methyloxalyl-9α-fluoro-20-ethylenedioxy-4-pregnene-11β,17,21-triol-3-one is dissolved in 10 ml. of methanol, and to the solution is added 5 ml. of a 10% aqueous solution of sodium carbonate. The resulting solution is heated under reflux for one hour, the reaction solution is diluted with water, and the methanol is evaporated therefrom under vacuum. The residual aqueous mixture is extracted with chloroform, and the combined chloroform extracts are washed with water, dried, and evaporated to a small volume. This solution is intimately contacted with acid-washed alumina, and the resulting absorbate is eluted with chloroform and a mixture of chloroform and acetone to give 2-methyl-9α-fluoro-20-ethylenedioxy-4-pregnene-11β,17α,21-triol-3-one.

To a solution of 300 mg. of 2-methyl-9α-fluoro-20-ethylenedioxy-4-pregnene-11β,17α,21-triol-3-one in 100 ml. of acetone is added 50 mg. of p-toluene sulfonic acid, and the resulting solution is heated under reflux for a period of 16 hours. An additional 50 mg. of p-toluene sulfonic acid is added, and the solution is heated for an additional 5 hours. The reaction mixture is diluted with water, and the acetone is distilled from the aqueous mixture under vacuum. The resulting aqueous suspension is extracted with several portions of chloroform and the chloroform extracts are combined and washed with dilute aqueous sodium bicarbonate solution. The chloroform layer is then dried and evaporated to dryness. The residual material is crystallized from ethyl acetate whereupon some unchanged starting material separates as a crystalline product. The ethyl acetate mother liquors are evaporated to dryness, and the residual material is dissolved in 3 ml. of pyridine. To the pyridine solution is added 1.5 ml. of acetic anhydride, and the resulting solution is heated at 100° C. for a period of 15 minutes. A mixture of ice and water is added to the reaction solution, whereupon a crystalline material separates which is recovered by filtration, washed with water and dried. This material is dissolved in 8:2 ether-chloroform, and the resulting solution is adsorbed on to acid-washed alumina. The adsorbate is eluted with mixtures of ether and chloroform, the 3:7 ether-chloroform eluant is evaporated to dryness, and the residual material is recrystallized from ether to give substantially pure 2-methyl-9α-fluoro-4-pregnene-11β,17α,21-triol-3-20-dione-21-acetate.

To a solution of 200 mg. of 2-methyl-9α-fluoro-4-pregnene-11β,17α,21-triol-3-20-dione-21-acetate in 20 ml. of absolute methanol, maintained under a nitrogen atmosphere, is added 0.25 ml. of a 2.0 N anhydrous methanolic solution of sodium methoxide. The resulting solution is allowed to stand at room temperature under the nitrogen atmosphere for a period of ten minutes, 0.03 ml. of acetic acid is added to the reaction mixture, and to the resulting mixture is added 20 ml. of ice water. The methanol is evaporated from the aqueous mixture under vacuum, and the crystalline material which precipitates is recovered by filtration, washed with water and dried to give substantially pure 2-methyl-9α-fluoro-4-pregnene-11β,17α,21-triol-3,20-dione.

In similar manner, and using 2-methyloxalyl-9α-fluoro-20-ethylenedioxy-4-pregnene-17α,21-diol-3,11-dione as starting material in place of the 2-methylovalyl-9α-fluoro-20-ethylenedioxy-4-pregnene-11β,17α,21-triol-3-one used hereinabove, there is obtained 2-methyl-9α-fluoro-4-pregnene-17α,21-diol-3,11,20-trione.

The 2-methyloxalyl-9α-fluoro-20-ethylenedioxy-4-pregnene-11β,17α,21-diol-3-one used as starting material in this example may be prepared as follows:

To a mixture of 600 ml. of dry benzene and 48 ml. of ethylene glycol is added 11 g. of 9α-fluoro-4-pregnene-11β,17α,21-triol-3,20-dione and 0.666 g. of p-toluene sulfonic acid monohydrate. This solution is heated under reflux for 19½ hours during which the water formed in the reaction is removed by azeotropic distillation and collected in a water separator. The reaction mixture is cooled to room temperature and the acid catalyst neutralized by the addition of 1.5 ml. of pyridine. The benzene solution is washed with 600 ml. of water and the water wash re-extracted twice with ether. The combined benzene and ether extracts are washed once with water and once with saturated salt solution, dried over magnesium sulfate, filtered and the solvents removed in vacuo. The residual material is recrystallized from ether-petroleum ether to give substantially pure 3,20-bis-ethylenedioxy-9α-fluoro-5-pregnene-11β,17α,21-triol.

A solution of 10 grams of 3,20-bis(ethylenedioxy)-9α-fluoro-5-pregnene-11β,17α,21-triol in 400 ml. of 90% aqueous acetic acid solution is heated on a steam bath for about 20 minutes, and the aqueous reaction mixture is extracted with chloroform. The chloroform extract is washed with water and dried. The chloroform extract is evaporated to dryness in vacuo, and the residual material crystallized to give substantially pure 20-ethylenedioxy - 9α - fluoro - 4 - pregnene - 11β,17α,21 - triol-3-one. 5 ml. of 2 N sodium methyloxide is evaporated to dryness in vacuo at 100° C. and 25 ml. of dry benzene is added thereto. To the mixture is added one gram of 20-ethylenedioxy-9α - fluoro - 4 - pregnene - 11β,17α,21-triol-3-one and two grams of dimethyl oxalate, and the resulting mixture is stirred at room temperature for 16 hours. Chloroform, and an excess of an aqueous solution of sodium dihydrogen phosphate, are added to the reaction mixture, the chloroform layer is separated, and the aqueous layer is extracted with additional chloroform. The combined chloroform extracts was washed with water, dried, and evaporated to dryness under high vacuum thereby removing excess dimethyl oxalate. The residual material is dissolved in methylene chloride, and the methylene chloride solution is shaken with 20 ml. of cold 1% aqueous potassium hydroxide solution; the aqueous alkaline layer is rapidly withdrawn and acidified with 20 ml. of cold 0.1 N aqueous sulfuric acid solution and excess sodium dihydrogen phosphate. The resulting slurry is extracted with chloroform, and the chloroform extract is dried and evaporated to dryness. The residual material is recrystallized from ethyl acetate to give substantially pure 2-methyloxalyl-20-ethylenedioxy-9α-fluoro-4-pregnene-11β-17α,21-triol-3-one.

The 2 - methyloxalyl - 20 - ethylenedioxy - 9α - fluoro - 4 - pregnene - 17α,21 - diol - 3,11 - dione used as starting material in this example for making 2 - methyl - 9α-fluoro - 4 - pregnene - 17α,21 - diol - 3,11,20 - trione can be prepared in accordance with the foregoing method starting with 9α - fluoro - 4 - pregnene - 17α - 21 - diol-3,11,20-trione.

*Example 6*

To a solution of 615 mg. of 2-methyloxalyl-9α-fluoro-20 - ethylenedioxy - 4 - pregnene - 11β,17α - 21 - triol-3-one in 15 ml. of acetone is added 1.24 g. of anhydrous potassium carbonate and 1.5 ml. of hexyl iodide, and the mixture is stirred overnight. The reaction mixture is evaporated to dryness under vacuum, and the residual material is distributed between water and chloroform. The chloroform phase is separated, and the aqueous phase is washed with several portions of chloroform. The combined chloroform extracts are dried and evaporated to dryness to give 2 - hexyl - 2 - methyloxalyl-9α-fluoro - 20 - ethylenedioxy - 4 - pregnene - 11β,17α,21-triol-3-one.

This 2 - hexyl - 2 - methyloxalyl - 9α - fluoro - 20-ethylenedioxy - 4 - pregnene - 11β,17α,21 - triol - 3 - one is dissolved in 10 ml. of methanol, and to the solution is added 5 ml. of a 10% aqueous solution of sodium carbonate. The resulting solution is heated under reflux for one hour, the reaction solution is diluted with water, and the methanol is evaporated therefrom under vacuum. The residual aqueous mixture is extracted with chloroform, and the combined chloroform extracts are washed with water, dried, and evaporated to a small volume. This solution is intimately contacted with acid-washed alumina, and the resulting adsorbate is eluted with chloroform and a mixture of chloroform and acetone to give 2 - hexyl - 9α - fluoro - 20 - ethylenedioxy-4-pregnene-11β,17α-21-triol-3-one.

To a solution of 300 mg. of 2 - hexyl - 9α - fluoro-20-ethylenedioxy - 4 - pregnene - 11β,17α - 21 - triol - 3-one in 100 ml. of acetone is added 50 mg. of p-toluene sulfonic acid, and the resulting solution is heated under reflux for a period of 16 hours. An additional 50 mg. of p-toluene sulfonic acid is added, and the solution is heated for an additional 5 hours. The reaction mixture is diluted with water, and the acetone is distilled from the aqueous mixture under vacuum. The resulting aqueous suspension is extracted with several portions of chloroform and the chloroform extracts are combined and washed with dilute aqueous sodium bicarbonate solution. The chloroform layer is then dried and evaporated to dryness. The residual material is crystallized from ethyl acetate whereupon some unchanged starting material separates as a crystalline product. The ethyl acetate mother liquors are evaporated to dryness, and the residual material is dissolved in 3 ml. of pyridine. To the pyridine solution is added 1.5 ml. of acetic anhydride, and the resulting solution is heated at 100° C. for a period of 15 minutes. A mixture of ice and water is added to the reaction solution, whereupon a crystalline material separates which is recovered by filtration, washed with water and dried. This material is dissolved in 8:2 ether-chloroform, and the resulting solution is adsorbed on to acid-washed alumina. The adsorbate is eluted with mixtures of ether and chloroform, the 3:7 ether-chloroform eluant is evaporated to dryness, and the residual material is recrystallized from ether to give substantially pure 2-hexyl-9α-fluoro-4-pregnene-11β,17α,21-triol-3-20-dione 21-acetate.

To a solution of 200 mg. of 2-hexyl-9α-fluoro-4-pregnene-11β,17α,21-triol-3,20-dione 21-acetate in 20 ml. of absolute methanol, maintained under a nitrogen atmosphere, is added 0.25 ml. of a 2.0 N anhydrous methanolic solution of sodium methoxide. The resulting solution is allowed to stand at room temperature under the nitrogen atmosphere for a period of ten minutes, 0.30 ml. of acetic acid is added to the reaction mixture, and to the resulting mixture is added 20 ml. of ice water. The methanol is evaporated from the aqueous mixture under vacuum, and the crystalline material which precipitates is recovered by filtration, washed with water and dried to give substantially pure 2-hexyl-9α-fluoro-4-pregnene-11β,17α,21-triol-3,20-dione.

*Example 7*

A solution of about 200 mg. of tertiary butylacetyl chloride in one milliliter of dry chloroform is added portion-wise to a cold solution of 500 mg. of 2-methyl-4-pregnene-11β,17α,21-triol-3,20-dione in 2.5 ml. of anhydrous pyridine. The resulting solution is allowed to stand for about 15 hours at 0 to 5° C., and the reaction solution is poured into 15 ml. of water. The resulting aqueous mixture is extracted with four 5 ml. portions of chloroform. The combined chloroform layers are washed with water, dilute aqueous hydrochloric acid solution, water, 5% aqueous sodium bicarbonate solution, and finally with water. The chloroform extract is dried over magnesium sulfate, the chloroform is evaporated in vacuo, and the residual material is crystallized from ethanol to give substantially pure 2-methyl-4-pregnene-11β,17α,21-triol-3,20-dione 21-(tertiary butyl acetate).

In similar manner, and using 2-methyl-4-pregnene-17α,21-diol-3,11,20-trione as starting material, in place of the 2-methyl-4-pregnene-11β,17α,21-triol-3,20-dione employed hereinabove in this example, there is obtained 2-methyl-4-pregnene-17α,21-diol-3,11,20-trione 21-(tertiary butyl acetate).

In similar manner, and using 2-methyl-9α-fluoro-4-pregnene-17α,21-diol-3,11,20-trione as starting material, in place of the 2-methyl-4-pregnene-11β,17α,21-triol-3,20-dione employed hereinabove in this example, there is obtained 2-methyl-9α-fluoro-4-pregnene-17α,21-diol-3,11,20-trione 21-(tertiary butyl acetate).

In similar manner, and using 2-methyl-9α-fluoro-4-pregnene-11β,17α,21-triol-3,20-dione as starting material, in place of the 2-methyl-4-pregnene-11β,17α,21-triol-3,20-dione employed hereinabove in this example, there is obtained 2-methyl-9α-fluoro-4-pregnene-11β,17α,21-triol-3,20-dione 21-(tertiary butyl acetate).

Example 8

Silver dihydrogen phosphate is prepared by intimately mixing 6.4 g. of $Ag_3PO_4$ and 2.0 ml. of 100% $H_3PO_4$, and washing the reaction product several times by decantation with ether. The tacky solid, thus obtained, is covered with 20 ml. of dry acetonitrile, the mixture is heated to boiling, and to the hot mixture is added, with stirring, 2.0 g. of 2-methyl-21-iodo-4-pregnene-17α-ol-3,11,20-trione. The resulting mixture is heated and stirred vigorously under reflux for a period of one hour, the reaction mixture is cooled, and to this reaction mixture is added 20 ml. of water. The acetonitrile is evaporated from this aqueous mixture under vacuum, and the resulting aqueous slurry is adjusted to a pH of 9.65 with 10% aqueous NaOH solution. The insoluble material is separated by filtration and washed thoroughly with water. The filtered solution is evaporated from the frozen state, and the residual white solid is extracted with several portions of dry methanol. The methanol extract is evaporated to a volume of about 20 ml., and this methanolic solution is passed through a column of 6 g. of a strongly acidic ion-exchange resin (e.g. a sulfonic acid type ion exchange resin such as Amberlite IR-120 manufactured by Rohm & Haas Co.) on the acid cycle. The resulting solution is then evaporated to a volume of about 5 ml., ether is added to the concentrated methanolic solution, and the crystalline material which precipitates is recovered by filtration and dried to give 2-methyl-4-pregnene-17α,21-diol-3,11,20-trione 21-phosphate.

In similar manner, and using 2-methyl-21-iodo-4-pregnene-11β,17α-diol-3,20-dione as starting material in place of the 2-methyl-21-iodo-4-pregnene-17α-ol-3,11,20-trione employed hereinabove, there is obtained 2-methyl-4-pregnene-11β,17α,21-triol-3,20-dione 21-phosphate.

In similar manner, and using 2-methyl-9α-fluoro-21-iodo-4-pregnene-11β,17α,diol-3,20-dione as starting material in place of the 2-methyl-21-iodo-4-pregnene-17α-ol-3,11,20-trione employed hereinabove, there is obtained 2-methyl-9α-fluoro-4-pregnene-11β,17α,21-triol-3,20-dione 21-phosphate.

In similar manner, and using 2-methyl-9α-fluoro-21-iodo-4-pregnene-17α-ol-3,11,20-trione as starting material in place of the 2-methyl-21-iodo-4-pregnene-17α-ol-3,11,20-trione employed hereinabove, there is obtained 2-methyl-9α-fluoro-4-pregnene-17α,21-diol-3,11,20-trione 21-phosphate.

The 2-methyl-21-iodo-4-pregnene-17α-ol-3,11,20-trione used a starting material in this example may be prepared as follows: a solution of 5.0 g. of 2-methyl-4-pregnene-17α,21-diol-3,11,20-trione in 20 ml. of pyridine is cooled to 0° C., and to the solution is added 1.35 ml. of methane sulfonyl chloride. The mixture is stirred at 0° C. for one hour, and 200 ml. of ice water is added to the reaction mixture. The crystalline material which precipitates is recovered by filtration, washed with water and dried. This material is recrystallized from methanol to give substantially pure 2-methyl-4-pregnene-17α,21-diol-3,11,20-trione 21-(methane sulfonate).

To a solution of 5 g. of 2-methyl-4-pregnene-17α,21-diol-3,11,20-trione 21-(methane sulfonate) in 150 ml. of acetone is added 7.5 g. of sodium iodide, and the resulting mixture is heated under reflux for 20 minutes. The reaction mixture is quenched by the addition of 150 ml. of ice water whereupon the sodium methane sulfonate dissolves, and crystalline material begins to precipitate. The acetone is evaporated from the reaction mixture under vacuum, and the crystalline material is recovered from the aqueous slurry by filtration, washed with water, and dried to give 2-methyl-21-iodo-4-pregnene-17α-ol-3,11,20-trione.

The 2-methyl-21-iodo-4-pregnene-11β,17α-diol-3,20-dione, used as starting material in this example for making 2-methyl-4-pregnene-11β,17α,21-triol-3,20-dione 21-phosphate, is prepared in accordance with the foregoing method starting with 2-methyl-4-pregnene-11β,17α,21-triol-3,20-dione.

The 2-methyl-9α-fluoro-21-iodo-4-pregnene-11β,17α-diol-3,20-dione, used as starting material in this example for making 2-methyl-9α-fluoro-4-pregnene-11β,17α,21-triol-3,20-dione 21-phosphate, is prepared in accordance with the foregoing method starting with 2-methyl-9α-fluoro-4-pregnene-11β,17α,21-triol-3,20-dione.

The 2-methyl-9α-fluoro-21-iodo-4-pregnene-17α-ol-3,11,20-trione, used as starting material in this example for making 2-methyl-9α-fluoro-4-pregnene-17α,21-diol-3,11,20-trione 21-phosphate, is prepared in accordance with the foregoing method starting with 2-methyl-9α-fluoro-4-pregnene-17α,21-diol-3,11,20-trione.

Example 9

To a solution of one gram of 2-methyl-4-pregnene-17α,21-diol-3,11,20-trione 21-(methane sulfonate) in 50 ml. of acetone is added 1.5 g. of sodium azide, and the resulting solution is heated under reflux, with stirring, for 3 hours. The yellow reaction mixture is cooled, diluted with 200 ml. of water, and the crystalline product which precipitates is recovered by filtration, washed with water and dried to give 2-methyl-21-azido-4-pregnene-17α-ol-3,11,20-trione.

To a solution of one gram of 2-methyl-4-pregnene-11β,17α,21-triol-3,20-dione 21-(methane sulfonate) in 50 ml. of acetone is added 1.5 g. of sodium azide, and the resulting solution is heated under reflux, with stirring, for 3 hours. The yellow reaction mixture is cooled, diluted with 200 ml. of water, and the crystalline product which precipitates is recovered by filtration, washed with water and dried to give 2-methyl-21-azido-4-pregnene-11β,17α-diol-3,20-dione.

Example 10

A solution containing 200 mg. of 2-methyl-4-pregnene-11β,17α,21-triol-3,20-dione and 100 mg. of β,β-dimethylglutaric anhydride in 1.0 ml. dry pyridine is heated under reflux for a period of about 1.5 hours with exclusion of atmospheric moisture. The reaction solution is added very slowly, with vigorous agitation to 20.0 ml. of a 0.5 N aqueous hydrochloric acid solution. The solid material which precipitates is recovered by filtration, washed well with water and dissolved in 6.0 ml. acetone. The acetone solution is decolorized with activated charcoal (Darco G-60), filtered, and the filtered solution is evaporated to dryness in vacuo. The residual material is dissolved in about 16 ml. of ethyl acetate, the ethyl acetate solution is extracted four times, each with 8 ml. of water containing 88 mg. of sodium bicarbonate. The aqueous extracts are separately acidified with aqueous hydrochloric acid solution, and the oil which separates is extracted with ethyl acetate. The ethyl acetate extracts are combined, evaporated to dryness, and the residual material is crystallized from 1:1 acetone-petroleum ether to give substantially pure 2-methyl-4-pregnene-11β,17α,21-triol-3,20-dione 21-(β,β-dimethyl-hemiglutarate).

In similar manner, and using 2-ethyl-4-pregnene-11β,17α,21-triol-3,20-dione as starting material, in place of the 2-methyl-4-pregnene-11β,17α,21-triol-3,20-dione employed hereinabove in this example, there is obtained 2-ethyl-4-pregnene-11β,17α,21-triol-3,20-dione 21-(β,β-dimethyl-hemiglutarate).

In similar manner, and using 2-propyl-9α-fluoro-4-pregnene-11β,17α,21-triol-3,20-dione as starting material, in place of the 2-methyl-4-pregnene-11β,17α,21-triol-3,20-dione employed hereinabove in this example, there is obtained 2-propyl-9α-fluoro-4-pregnene-11β,17α,21-triol-3,20-dione 21-(β,β-dimethyl-hemiglutarate).

In similar manner, and using 2-hexyl-4-pregnene-17α,21-diol-3,11,20-trione as starting material, in place of the 2-methyl-4-pregnene-11β,17α,21-triol-3,20- dione employed hereinabove in this example, there is obtained 2 - hexyl - 4 - pregnene - 17α,21 - diol - 3,11,20-trione 21-(β,β-dimethyl-hemiglutarate).

*Example 11*

A solution of 0.7 g. of 2-methyl-4-pregnene-11β,17α,21-triol-3,20-dione in 25 ml. of benzene is dried by distilling off about 5 ml. of benzene. To the dried benzene solution is added 5 ml. of phenyl isocyanate, and the mixture is heated under reflux for four hours. The reaction mixture is cooled, and evaporated to dryness under reduced pressure, thereby removing the benzene and excess phenyl isocyanate. The residual material is washed with a small amount of acetone, and is crystallized from a mixture of acetone-ether to give 2-methyl-4-pregnene-11β,17α,21-triol-3,20-dione 21-(N-phenyl-carbamate).

In similar manner, and using 2-methyl-4-pregnene-17α,21-diol-3,11,20-trione as starting material, in place of the 2-methyl-4-pregnene-11β,17α,21-triol-3,20-dione employed hereinabove in this example, there is obtained 2 - methyl - 4 - pregnene - 17α,21 - diol - 3,11,20-trione 21-(N-phenyl-carbamate).

In similar manner, and using 2-methyl-9α-fluoro-4-pregnene-11β,17α,21-triol-3,20-dione as starting material, in place of the 2-methyl-4-pregnene-11β,17α,21-triol-3,20-dione employed hereinabove in this example, there is obtained 2-methyl-9α-fluoro-4-pregnene-11β,17α,21-triol-3,20-dione 21-(N-phenyl-carbamate).

*Example 12*

100 mg. of propionic anhydride is dissolved in 0.5 ml. of freshly distilled pyridine, 50 mg. of 2-hexyl-9α-fluoro-4-pregnene-11β,17α,21-triol-3,20-dione is added to the solution, and the resulting mixture is allowed to stand at room temperature for a period of about 24 hours, with occasional swirling. The reaction solution is added, dropwise, with stirring, to about 5 ml. of cold, dilute aqueous hydrochloric acid, and the material which precipitates is recovered by filtration, washed with water, dried and recrystallized from acetone-petroleum ether to give substantially pure 2-hexyl-9α-fluoro-4-pregnene-11β,17α,21-triol-3,20-dione 21-propionate.

Various changes and modifications may be made in carrying out the present invention without departing from the spirit and scope thereof. Insofar as these changes and modifications are within the purview of the annexed claims, they are to be considered part of this invention.

I claim:

1. 2-lower alkyl-2-lower aliphatic carboxylic acyl-20-ethylenedioxy-4-pregnene-17α,21-diol-3,11-dione.

2. 2-methyl - 2 - formyl-20-ethylenedioxy-4-pregnene-17α,21-diol-3,11-dione.

3. 2-methyl - 2 - methyloxalyl-20-ethylenedioxy-4-pregnene-17α,21-diol-3,11-dione.

4. 2-lower alkyl-2-lower aliphatic carboxylic acyl-20-ethylenedioxy-4-pregnene-11β,17α,21-triol-3-one.

5. 2 - methyl - 2 - methyloxalyl-20-ethlenedioxy-4-pregnene-11β,17α,21-triol-3-one.

6. 2 - ethyl - 2 - methyloxalyl-20-ethylenedioxy-4-pregnene-11β,17α,21-triol-3-one.

7. 2-lower alkyl-2-lower aliphatic carboxylic acyl-9α-fluoro 20-ethylenedioxy - 4 - pregnene-11β,17α,21-triol-3-one.

8. 2 - methyl - 2 - methyloxalyl-9α-fluoro-20-ethylenedioxy-4-pregnene-11β,17α,21-triol-3-one.

9. 2-lower alkyl-2-lower aliphatic carboxylic acyl-9α-fluoro - 20 - ethylenedioxy - 4 - pregnene-17α,21-diol-3,11-dione.

10. 2 - methyl- 2 - methyloxalyl-9α-fluoro-20-ethylenedioxy-4-pregnene-17α,21-diol-3,11-dione.

11. 2-lower aliphatic carboxylic acyl-20-ethylenedioxy-4-pregnene-17α,21-diol-3,11-dione.

12. 2-formyl-20-ethylenedioxy-4-pregnene-17α,21-diol-3,11-dione.

13. 2 - methyloxalyl - 20 - ethylenedioxy-4-pregnene-17α,21-diol-3,11-dione.

14. 2-lower aliphatic carboxylic acyl-20-ethlenedioxy-4-pregnene-11β,17α,21-triol-3-one.

15. 2 - methyloxalyl - 20 - ethylenedioxy-4-pregnene-11β,17α,21-triol-3-one.

16. 2-lower aliphatic carboxylic acyl-9α-fluoro-20-ethylenedioxy-4-pregnene-11β,17α,21-triol-3-one.

17. 2 - methyloxalyl - 9α - fluoro-20-ethylenedioxy-4-pregnene-11β,17α,21-triol-3-one.

18. 2-lower aliphatic carboxylic acyl-9α-fluoro-20-ethylenedioxy-4-pregnene-17α,21-diol-3,11-dione.

19. 2 - methyloxalyl - 9α - fluoro-20-ethylenedioxy-4-pregnene-17α,21-diol-3,11-dione.

References Cited in the file of this patent

UNITED STATES PATENTS 2,786,856   Cutler et al. _ _ _ _ _ _ _ _ _ _ _  Mar. 26, 1957

OTHER REFERENCES

Fieser et al.: Natural Products Related to Phenanthrene, 3rd Ed., pp. 407, 423 (1949).